T. FAIRBANKS.
WEIGHING SCALE BEAM.
No. 175,597. Patented April 4, 1876.
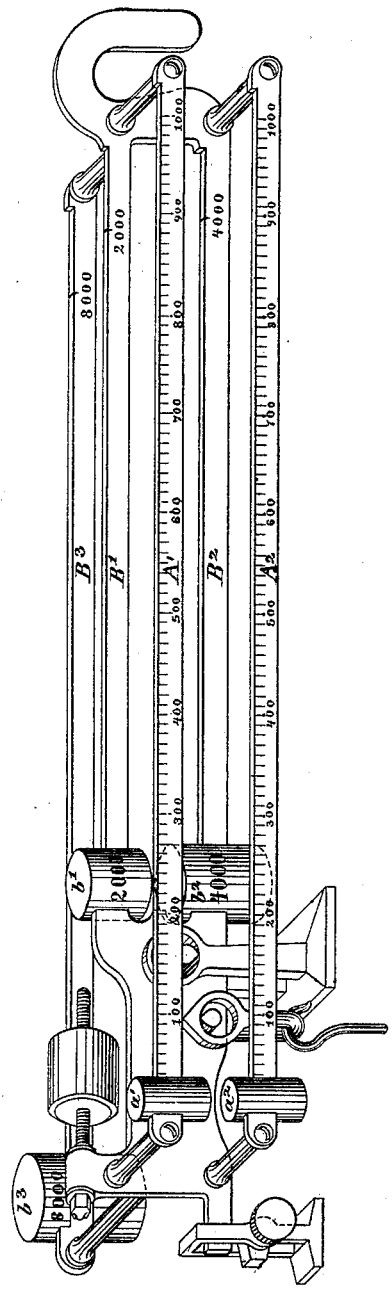

UNITED STATES PATENT OFFICE.

THADDEUS FAIRBANKS, OF ST. JOHNSBURY, VERMONT.

IMPROVEMENT IN WEIGHING-SCALE BEAMS.

Specification forming part of Letters Patent No. 175,597, dated April 4, 1876; application filed January 20, 1875.

*To all whom it may concern:*

Be it known that I, THADDEUS FAIRBANKS, of St. Johnsbury, Caledonia county, Vermont, have invented certain Improvements in Weighing-Scale Beams, of which the following is a specification:

My invention relates to beams used in platform-scales, hay-scales, railroad-track scales, and the like, adapted for weighing large and widely-varying quantities of merchandise.

It is common to employ removable weights, which are hung, as required, upon the free end of an ordinary beam, and allowed for in determining the weight. The necessity for some expedient of the kind has induced its general adoption, although subject to great objection from the liability of mistakes in observing what weights are so used, and also to frequent annoyance and expense from the accidental loss of such loose weights.

I have improved the weighing-beam and the manner of attaching the weights thereto by permanently connecting to the beam certain shifting weights, which, by being shifted from one end to the other of several separate bars forming part of the beam, perform the functions of the ordinary removable weights, and avoid the objections.

The following is a description of what I consider the best means of carrying out the invention.

The accompanying drawing forms a part of this specification, and represents my beam with its poises and shifting weights ready for use.

The entire beam is provided at one end with the ordinary facilities for adapting it to a scale, such as pivots, loops, a regulating-weight, &c. It is constructed with several longitudinal bars, $A^1$ $A^2$ $B^1$ $B^2$ $B^3$. The front bars $A^1$ $A^2$ are graduated and carry each a poise, $a^1$ $a^2$, which, being moved by the attendant until the right position is found on the beam, indicates the weight in the ordinary manner, $a^2$ being moved a little whenever an underestimate of the weight has been made, so that the whole traverse of $a^1$ is found not quite sufficient. The bars $B^1$ $B^2$ $B^3$ should not be graduated. They are left entirely plain, or provided only with a mark or notch at each extremity, to aid in assuring that the corresponding weights are in exactly the right place. They perform their functions by one or more of the weights $b^1$ $b^2$ $b^3$ being shifted by the attendant from one end to the other of their respective bars. The shifting of each weight, as aforesaid, in one direction corresponds to the taking off of an ordinary weight from a counterpoise depending from the extreme or free end of an ordinary beam, and the shifting thereof in the opposite direction corresponds to the putting on of the same.

The bar $B^1$ carries a weight, $b^1$, and the bar $B^2$ a heavier weight, $b^2$, and the bar $B^3$ a still heavier weight, $b^3$, correspondingly operated. Each of the bars $B^1$ $B^2$ $B^3$, &c., is plainly marked with the amount to which the shifting of its respective poise corresponds. The corresponding poises are also, preferably, so marked.

The full capacity of the graduated bar $A^1$ being one thousand, that of $A^2$ may be the same, so that either may be used in the ordinary way for weighing or for allowing for tare, and also that both may be used in some emergencies, and the indications added together, as will be obvious.

The weight $b^1$ should be of such size that the shifting of it from one end to the other of the bar $B^1$ stands for an amount equal to the full amount indicated on one of the bars $A^1$ $A^2$—say, one thousand pounds. The weight $b^2$ should be so much heavier than $b^1$ that the shifting of it on the bar $B^2$ indicates an amount twice as great, or two thousand pounds. The shifting of the weight $b^3$ on the bar $B^3$ indicates an amount equal to double the capacity of $B^2$, or four thousand pounds, and if another bar was added, to be marked $B^4$, the shifting of the weight thereon should indicate an amount equal to double the capacity of $B^3$, or eight thousand pounds, and so on in geometrical progression, continuing the series of beams or bars to any desirable number, the capacity of the last beam being equal to double that of the one before it in the series.

Thus the weighing-beam performs all the ordinary functions of that important member of the mechanism, with the addition of a feature or modification by which several weights, corresponding in function to the ordinary removable weights upon the counterpoise, are permanently mounted, each on a corresponding bar parallel to the others, and forming part of the beam, and which weights are used by being moved instantly from one end to the other of their respective bars.

This provision overcomes a difficulty heretofore experienced, in consequence of the occasional misreading of the number or grade of weight added to the beams. It is easier to observe the position of the weights on the bars $B^1 B^2 B^3$, whether they are at one end or the other, than it is to determine what weights are in the compact pile corresponding thereto upon the counterpoise depending from the end of the ordinary beam. The permanent connection also of these weights avoids the possibility of their being lost, which is, in practice, a great desideratum.

I am aware that compound beams, having several parallel bars with shifting weights have been before known; but the weight of such beam of proper stiffness is sufficiently great to make its proper balance important. By placing my center of motion within the length of the beam to the extent indicated, I partially balance the beam and its weights; also by placing the center of motion as indicated I avoid the crowding of the space in its vicinity with supporting-brackets for the bars. The total length of the beam for a given size of weights, and a given capacity, and a given magnitude of graduation is also reduced. I get an equal amount of effect with less metal, less space, and less strain.

The operation of my invention is obvious. Instead of putting on or taking off detachable weights from the rod dependent from the free end of the weighing-beam, I move one or more of the weights or poises $b^1 b^2 b^3$, &c., from one end to the other of the bars $B^1 B^2 B^3$. Then, having got the scale into the same condition as if the ordinary corresponding weights had been hung on or taken off the dependent rod on the end of the beam, I proceed to ascertain the balance or fractional weight by moving the poise $a^1$ on the graduated bar $A^1$, and observing the point at which the scale balances in the ordinary way.

The additional bar $A^2$, with its poise $a^2$, is not essential to the success of the other portions.

Having thus fully described my invention, what I claim as new, and desire to secure by Letters Patent of the United States, is—

The compound beam described, having parallel bars carrying permanently-connected weights, and mounted on a knife-edge, located within its length, so that the weights shall be traversed from one side of the axis to the other, as herein specified.

In testimony whereof I have hereunto set my hand this 15th day of January, 1875, in the presence of two subscribing witnesses.

THADDEUS FAIRBANKS.

Witnesses:
HENRY FAIRBANKS,
THOMAS SPOONER.